July 10, 1962 C. K. STILLWAGON 3,043,557
DISC VALVE HAVING PERIPHERY SEALING RIBS
Filed April 11, 1960
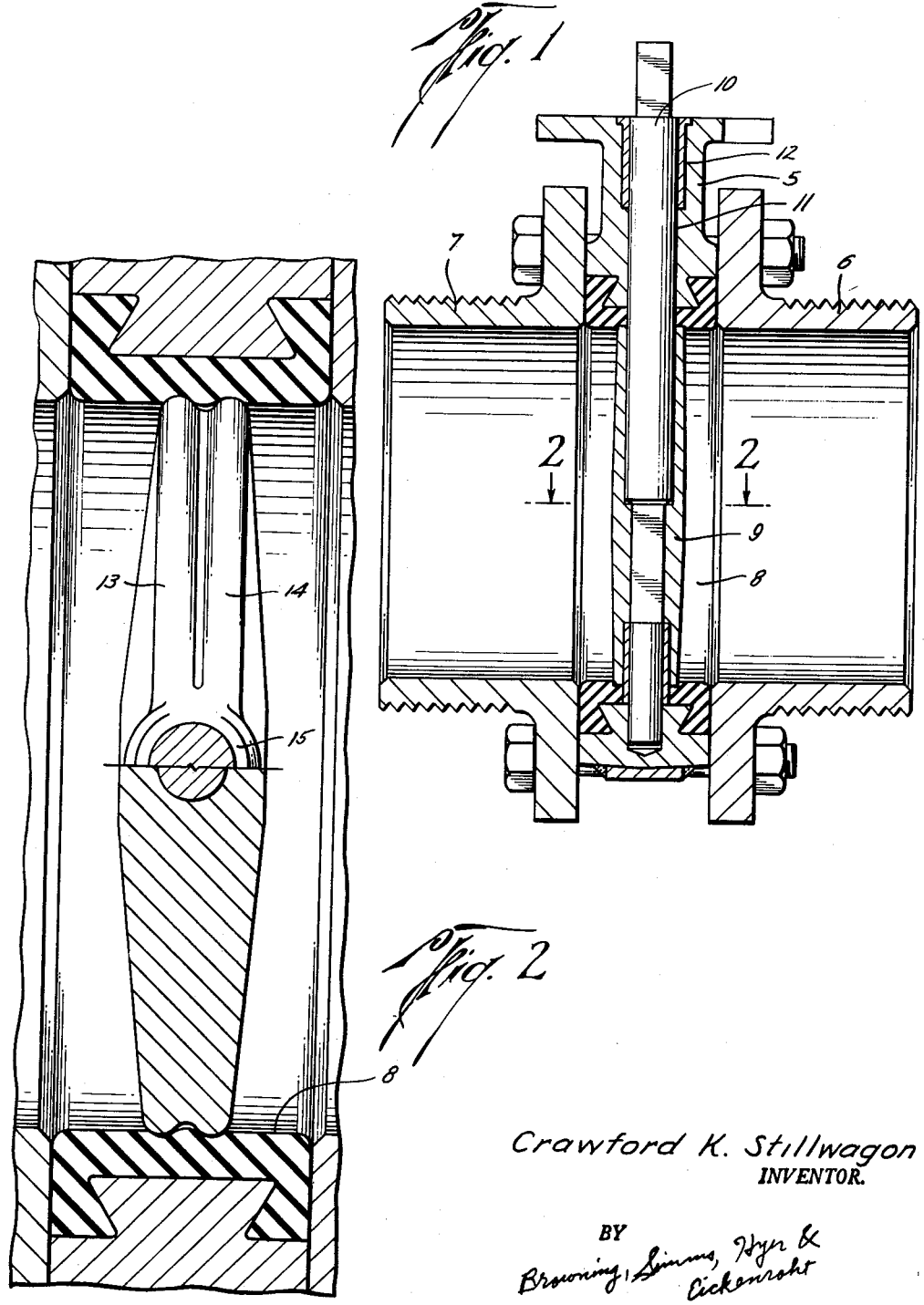
Crawford K. Stillwagon
INVENTOR.
BY Browning, Simms, Wyn & Cickenrohr
ATTORNEYS United States Patent Office 3,043,557
Patented July 10, 1962

3,043,557
DISC VALVE HAVING PERIPHERY SEALING RIBS
Crawford K. Stillwagon, 5325 Kirby Drive, Houston, Tex.
Filed Apr. 11, 1960, Ser. No. 21,213
10 Claims. (Cl. 251—306)

This invention relates to improvements in butterfly or disc valves and refers more particularly to improvements in the seating and sealing mechanism between the disc and a resilient seat, to increase the pressures that may be controlled by the valves without increasing the torque requirements for operation beyond acceptable limits.

The invention relates to improvements to the type of valve shown in United States Patent No. 2,740,423, issued April 3, 1956, or to the valve shown in my copending application for United States Patent Serial No. 768,666, filed October 21, 1958, now Patent No. 2,994,342 granted Aug. 1, 1961, and entitled "Valve."

Valves of this class have served admirably in handling fluids at relatively low pressures as for example up to 150 p.s.i. to 200 p.s.i. They offer the advantage of low cost and simplicity but have not been considered reliable for handling fluid under pressures greatly in excess of 200 p.s.i.

With the rubber seated disc valve, in which the seal is provided by interference between the disc and the resilient seat, the seal is dependent upon the amount of interference between the disc and the seat. While the interference may be increased so as to increase the pressure which may be sealed against, the torque required for opening and closing the valve provides a practical limit to the amount of interference that may be employed.

It has been suggested as for example in United States Patent No. 1,990,309, issued to W. H. Phillips, February 5, 1935, to inject a fluid pressure between a resilient seat and the valve casing to force the seat into engagement with the periphery of the disc to provide the seal, in lieu of the use of interference between the seat and disc. By this expedient, the pressure between the seat and valve body may be kept greater than the pressure sealed against to provide the seal. However, this has not been entirely satisfactory due to the difficulty in securing the seat in place against pressure between the seat and the valve body and due to the problems and expense attendant to maintenance of equipment for pressurizing the space between the valve body and seat.

An object of this invention is to provide a seat and disc sealing arrangement for butterfly valves in which the sealing is dependent on the interference between the disc and seat, that will control relatively high pressure fluids with a relatively low increase in torque requirements for operating the valve.

Another object is to provide a sealing mechanism for interfering type butterfly valves in which the area of contact between seat and disc is increased so that higher pressures may be sealed against without proportionately increasing the torque requirements for operation of the valve.

Another object is to provide a sealing mechanism for interfering type butterfly valves in which, to effect the seal, the disc is provided with two peripheral ribs for interfering engagement with the seat arranged so that on rotation of the valve, the leading rib attenuates the seat during movement of the valve member at all times that both ribs are in engagement with the seat whereby the trailing rib has reduced interference with the rubber during movement of the valve member to minimize the operating torque of the valve.

Other and further objects of the invention will appear from the specification and the drawings.

In the accompanying drawings forming a part of the instant specification and illustrating a preferred embodiment of the invention by way of example:

FIG. 1 is a vertical cross-sectional view, on a plane including the axis of flow through the valve, of a butterfly valve constituting a preferred embodiment of this invention; and FIG. 2 is a view, upon an enlarged scale, of a valve shown in FIG. 1 and taken on the line 2—2 in FIG. 1, in the direction of the arrows.

In the drawings, the numeral 5 designates an annular body, fabricated of rigid material such as metal secured between two flanged fittings 6 and 7 that may be bolted together to secure a seat 8 in place. The seat 8 is made of resilient yieldable material, such as rubber or suitable synthetics, and is anchored in place relative to the body 5 by the dovetail arrangement shown. While any suitable means for securing the seat in position may be used, the details of the construction of the seat relative to the body and connecting flanges in the preferred manner are shown in the aforementioned Letters Patent 2,740,423 and application Serial No. 768,666 and a detailed description will be dispensed with. It is to be noted, however, that the seat 8 should snugly fit the inner wall of the body 5 so that the body will resist outward displacement of the seat due to forces generated either by the pressure contained within the line or the actuation of the valve disc.

The valve disc is shown at 9 and is mounted by a stem 10 for rotation or swinging movement about the axis of the stem 10 that extends transversely of the valve body 5. The stem extends through an opening 11 in the body and a sleeve bearing 12 may be used to journal the stem. The lower end of the stem is journaled in an opening in the body as shown. The seat has a snug fit with the stem where it passes through the seat. It is contemplated that the stem and disc may be integral as, for example, shown in my copending application for U.S. Patent Serial No. 764,621, filed October 1, 1958, for "Valve."

The stem may have a square fit with the valve member 9 or otherwise be connected with it so that rotation of the stem will rotate the disc to shift it from the position shown in the drawings where the valve is closed, to a position 90° from that shown to provide the maximum opening of the valve.

The novelty of the invention may be considered as associated with the ribs 13 and 14 of the disc which provide the interference fit with the resilient material of the seat 8. Associated with the ribs are the hubs of the disc about the stem, the upper one of which is shown at 15 in FIG. 2. A similar hub surrounds the lower portion of the stem.

The surfaces of the ends of the hubs are preferably formed as a part of a cylinder of the same diameter as the maximum diameter of the ribs 13 and 14. This diameter is greater than the inner diameter of the seat so that the ribs and the hub ends of the disc have interference with the seat. It is this interference or squeezing of the rubber which provides a sealing action of the valve. With the disc-stem arrangement of Serial No. 764,621 only a single hub would be provided and the ribs would extend over the bottom of the disc.

The ribs 13 and 14 are preferably formed with tapering side edges as can be provided by the arcuate surfaces shown. By the use of the taper, the resistance to movement of the ribs offered by the interfering rubber of the seat is minimized. The ribs form a groove between them that extends from hub to hub on each peripheral side of the disc. It has been found that best results are obtained, from the standpoint of sealing off highest pressures, when the groove is deep enough that the material of the seat does not completely fill the groove with the valve in closed position. However, improved results have been obtained when the groove is shallow enough that the rubber material of the seat will completely fill the groove with the valve disc in the FIG. 2 position.

It is believed that the operation of the valve is apparent from the foregoing description. The upper end of the stem is equipped with an out-of-round part to receive the wrench or handle for operating the valve. Rotation of the stem 90° results in like rotation of the valve member to move it between opened and closed positions. Of course on large size valves the valve may be electrically operated or a mechanism providing a mechanical advantage between the handle and stem may be utilized.

It will be noted that the ribs 13 and 14 are on the edges of the disc and that in moving the valve from opened to closed position the leading rib will first engage the seat and the resistance to movement due to contact between the rib and the seat is minimized by the tapered surface of the rib that engages the seat, the taper permitting easier flow of the resilient material to accommodate the movement. Furthermore, the frictional contact between the rib and the seat causes attenuation of the seat in the direction of movement of the leading rib so that the interference between the trailing rib and the seat is reduced as compared to the interference with the first or only a single rib. This occurs on each side of the stem and it is believed accounts for the fact that the torque requirement for operating the valve has been found to be considerably less than twice the torque requirement for operating a single rib valve with the same degree of interference. The pressure differential also acts to partially aid the attenuation of the seat on the side of the disc that is moving in the direction of the low pressure side of the valve.

When the valve movement terminates, with the valve in fully closed position, the resilient material of the seat again assumes its shape subject only to deformation due to the forces of pressure within the closed valve or the mechanical deformation provided by the now stationary ribs.

The seal at the hubs is provided by the interference of the material of the hub with the seat. The thickness of the hub and therefore the area of contact between the hub and the seat is greater than that of the ribs so that an effective seal is provided at the hubs. The edges of the disc at the hubs may be sharper, which gives better sealing performance, because the hub has a nearly constant bearing against the seat. The edge is not called on to work the rubber as the disc is rotated.

It has been found that the difference in diameters of the disc and the seat may range from about .060 to .110 inch. Of course, the disc diameter is the largest and the seat diameter the smallest. Nothing is considered to be critical about this range of interference and it is given by way of illustration and not as a limitation. It is contemplated that the interference may be outside this range.

It will be seen that the ends and objects of the invention have been accomplished. There has been provided an interference type butterfly valve capable of handling pressures in the order of 500 p.s.i. in which the torque requirement of the valve is not prohibitive. The construction of the valve is simple and lends itself to economic fabrication. The arrangement is such that upon actuation of the valve cooperation between the ribs, the seat, and the pressure are such that the torque requirements are considerably lower than were expected and are well within the range of permissible operation.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A butterfly valve comprising a rigid body with an annular opening therethrough, an annular inner seat of resilient sealing material secured snugly against the inner wall of the body, a valve disc and operating stem therefor for controlling flow through the seat, the stem extending transversely of the opening through the seat and body, said valve disc having spaced peripherally extending rigid ribs one formed on each edge of the disc forming a groove therebetween, the inner diameter of the seat and the outer diameter of the disc ribs being such as to provide a substantial interference therebetween when the disc is in closed position.

2. A butterfly valve comprising a rigid body with an annular opening therethrough, an annular inner seat of resilient sealing material secured snugly against the inner wall of the body, a valve disc and operating stem therefor for controlling flow through the seat, the stem extending transversely of the opening through the seat and body, said valve disc having spaced peripherally extending rigid ribs one formed on each edge of the disc forming a groove therebetween, the inner diameter of the seat and the outer diameter of the disc ribs being such as to provide a substantial interference therebetween when the disc is in closed position with a space remaining within the groove between the disc and seat.

3. A butterfly valve comprising a rigid body with an annular opening therethrough, an annular inner seat of resilient sealing material secured snugly against the inner wall of the body, and a valve disc and operating stem therefor mounted to control flow through the seat, the stem extending transversely of the opening through the seat and body, the disc formed with a hub about the stem, the periphery of the disc at the hub being a portion of a cylinder, rigid ribs extending along the periphery of the disc from the hub on each peripheral edge of the disc, said ribs forming a peripheral groove therebetween, the inner diameter of the seat and the outer diameter of the disc at the ribs and hub being such as to provide a substantial interference therebetween when the disc is in closed position.

4. A butterfly valve comprising a rigid body with an annular opening therethrough, an annular inner seat of resilient sealing material secured snugly against the inner wall of the body, and a valve disc and operating stem therefor mounted to control flow through the seat, the stem extending transversely of the opening through the seat and body, diametrically opposed hubs formed on the disc about the stem, the periphery of the disc at the hub ends being a portion of a cylinder, two rigid ribs extending between the hubs along the periphery of the disc on each peripheral side of the hubs, said ribs forming a peripheral groove therebetween, the inner diameter of the seat and the outer diameter of the disc at the ribs and hubs being such as to provide a substantial interference therebetween when the disc is in closed position.

5. A butterfly valve comprising a rigid body with an annular opening therethrough, an annular inner seat of resilient sealing material secured snugly against the inner wall of the body, and a valve disc and operating stem therefor mounted to control flow through the seat, the stem extending transversely of the opening through the seat and body, diametrically opposed hubs formed on the disc about the stem, the periphery of the disc at the hub ends being a portion of a cylinder, two rigid ribs extending between the hubs along the periphery of the disc on each peripheral side of the hubs, said ribs forming a peripheral groove therebetween, the inner diameter of the seat and the outer diameter of the disc at the ribs and hubs being such as to provide a substantial interference therebetween when the disc is in closed position with a space remaining within the groove between the disc and seat.

6. The butterfly valve of claim 5, wherein the ribs have tapering surfaces that facilitate movement of the disc in the interfering seat in opening and closing the valve.

7. The butterfly valve of claim 5, wherein the ribs are formed with arcuate surfaces, when viewed in cross section, to facilitate movement of the disc in the interfering seat in opening and closing the valve.

8. A disc valve member for use in a butterfly valve having a rigid body with an annular opening therethrough and an annular inner seat of resilient sealing material secured snugly against the inner wall of the body, said disc valve member comprising a generally circular disc having a hub section with diametrically opposed enlargements, the surfaces of which are arcuate and struck on diameters of the disc, rigid ribs extending between the hubs on the circular periphery of the disc, two such ribs on each peripheral side with a groove formed therebetween, the ribs having tapering surfaces on each side.

9. A disc valve member for use in a butterfly valve having a rigid body with an annular opening therethrough and an annular inner seat of resilient sealing material secured snugly against the inner wall of the body, said disc valve member comprising a generally circular disc having a hub section with diametrically opposed enlargements, the surfaces of which are arcuate and struck on diameters of the disc, rigid ribs extending between the hubs on the circular periphery of the disc, two such ribs on each peripheral side with a groove formed therebetween, the ribs being formed with arcuate surfaces, when viewed in cross section.

10. A disc valve member for use in a butterfly valve having a rigid body with an annular opening therethrough and an annular inner seat of resilient sealing material secured snugly against the inner wall of the body, said disc valve member comprising a generally circular disc having an enlarged hub section about which the disc is adapted to rotate, the peripheral surface of the hub being arcuate and struck on the diameter of the disc, rigid ribs extending peripherally on each edge of the disc and terminating in the hub section, the ribs forming a groove therebetween, the ribs having tapering surfaces on each side.

References Cited in the file of this patent

UNITED STATES PATENTS

| | | |
|---|---|---|
| 1,977,351 | Phillips | Oct. 16, 1934 |
| 1,990,309 | Phillips | Feb. 5, 1935 |
| 2,740,423 | Stillwagon | Apr. 3, 1956 |
| 2,772,850 | Eaton | Dec. 4, 1956 |